April 19, 1949.  J. C. HINTON  2,467,827
DRILL CHUCK AND KEY THEREFOR
Filed Oct. 1, 1946
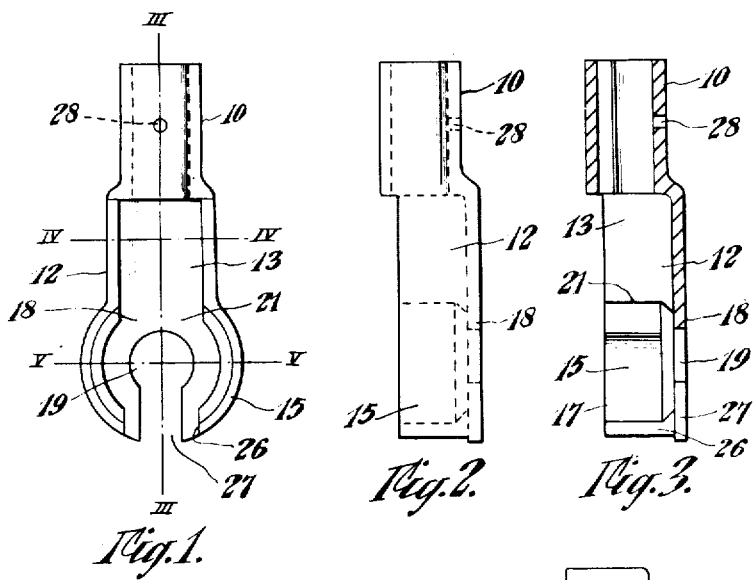
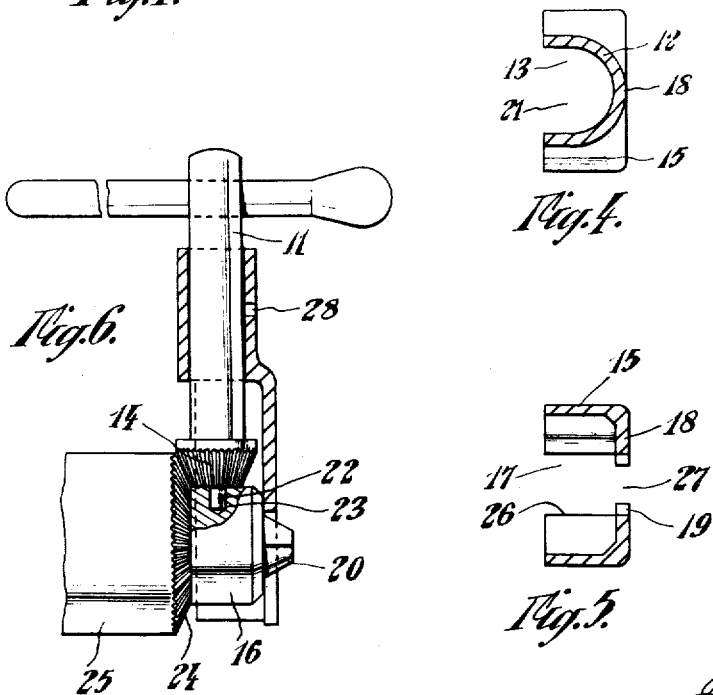
Inventor:
James Craddock Hinton,
By: Pierce, Scheffler & Parker.
Attorneys.

Patented Apr. 19, 1949

2,467,827

UNITED STATES PATENT OFFICE 2,467,827

DRILL CHUCK AND KEY THEREFOR

James Craddock Hinton, Bailrigg, Lancaster,
England

Application October 1, 1946, Serial No. 700,577
In Great Britain October 10, 1945

6 Claims. (Cl. 279—1)

This invention relates to keys for drill chucks of the type comprising a rotatable gripping sleeve provided externally with a bevel tooth gear, and particularly to keys therefor which are provided with an external bevel tooth gear adapted to engage the tooth gear on the chuck sleeve whereby the chuck sleeve is rotated, and thereby caused to grip the chuck jaws when the key is manually rotated. The key is usually provided with a turning handle at one end and an axially disposed pin at the other end, the said pin being adapted to enter a radially disposed hole or bearing in a non-rotatable sleeve also provided on the chuck wherein the key is located with the bevel toothed gears in engagement with each other. In such devices there is a possibility of the key swinging to one side after use, owing to the pin at one end providing the sole retaining engagement with the chuck, and thereby allowing the gears to move out of mesh with each other. The object of the present invention is to provide a guide device adapted to retain the key in engagement with the chuck.

A guide according to this invention comprises a cupped sleeve adapted to embrace the chuck and a second sleeve having its axis angularly disposed relative to the said first sleeve, the said second sleeve being adapted to receive the shank of the key.

One form of guide according to this invention is illustrated in the accompanying drawings in which:

Fig. 1 is a front elevation;

Fig. 2 is a side elevation;

Fig. 3 is a sectional elevation, taken on line III—III of Fig. 1; and

Figs. 4 and 5 are sectional plan views, taken, respectively, on lines IV—IV and V—V of Fig. 1.

Fig. 6 shows the guide in use with a drill chuck and key therefor.

The guide comprises a sleeve 10 in which the shank 11 of the key is adapted to be disposed and to rotate, the sleeve providing a bearing for the said shank. One end of the sleeve 10 is extended and enlarged in diameter at 12 and is also cut away at the front 13, so that the bevel tooth gear 14 on the key may be located in said enlarged portion 12 and one side of the said gear 14 may be exposed. Below said enlarged portion 12 of the sleeve 10 a second sleeve 15, hereinafter referred to as the guide chuck sleeve, is provided having its axis disposed at right angles to the axis of the key shank sleeve 10, the said guide chuck sleeve 15 being adapted to embrace the non-rotatable sleeve 16 on the chuck.

For this purpose the guide chuck sleeve 15 is open for its full diameter at one end 17 so that it may be passed over said non-rotatable sleeve 16 and is provided with an inwardly directed collar or flange 18 at the other end so that said collar or flange 18 may abut the end of the non-rotatable sleeve 16. The collar or flange 18 is axially orificed at 19 so that the jaws 20 of the chuck may project therethrough. The top of the guide chuck sleeve 15, which is in alignment with the key shank sleeve 10 is cut away or orificed at 21 to allow the pin 22 on the end of the key to pass therethrough and enter the hole 23 in the non-rotatable sleeve 16 on the chuck; conveniently, this is effected by forming the sleeve 16 in situ with the sleeve 10 and its enlargement 12 in the form of a swelling below said enlargement 12.

The relative sizes and positions of all the parts of the guide are such that when it is in position on the chuck and key the pin 22 on the key enters its bearing hole 23, and the bevel toothed gear 14 on the key is in correct meshing engagement with the bevel toothed gear 24 on the rotatable gripping sleeve 25 of the chuck. The guide chuck sleeve 15 may also be cut way at 26 on the side remote from the key shank sleeve 10, and the collar or flange 18 is slotted at 27 from the orifice 19 so that the guide may be passed over a drill in the chuck.

In use, the guide, with the key disposed therein, is disposed on the chuck non-rotatable sleeve 16, the key is moved axially in its sleeve 10 until the pin 22 thereon enters the hole 23 in the non-rotatable sleeve 16 and the bevel tooth gear 14 engages the bevel tooth gear 24. When the key is turned so as to rotate the chuck gripping sleeve 25 the guide will hold the key rigidly in its correct position relative to the chuck. The key shank sleeve 10 may be provided with an oiling hole 28.

What I claim is:

1. A chuck key and guide adapted for use with drill chucks of the type having a projecting cylindrical part housing the chuck jaws and provided with at least one radial hole for the reception of a pin projecting from the end of a chuck key and a relatively rotatable sleeve having bevel gear teeth for engagement with a bevel pinion on the shank of the key, comprising a cylindrical shank having a bevel gear and a projecting pin at one end thereof, a tubular part slidable axially on said shank, a sleeve portion of larger diameter than the tubular part arranged with its axis at right angles to said tubular part and capable of fitting closely on the projecting cylindrical part of a chuck, and an intermediate part connecting said tubular part and said sleeve portion.

2. A chuck key and guide adapted for use with drill chucks of the type having a projecting cylindrical part housing the chuck jaws and provided with at least one radial hole for the reception of a pin projecting from the end of a chuck key and a relatively rotatable sleeve having bevel gear teeth for engagement with a bevel pinion on the shank of the key, comprising a cylindrical shank having a bevel gear and a projecting pin at one end thereof, a tubular part slidable on said shank, a trough-like extension from one end of said tubular part, said trough-like extension being of greater diameter than said tubular part to accommodate the bevel pinion on the shank, and a circular enlargement at the end of the said trough-like extension, the said circular enlargement having its axis at right angles to the axis of the said tubular part and having semi-cylindrical walls to embrace the projecting cylindrical part of a chuck.

3. A chuck key and guide adapted for use with drill chucks of the type having a projecting cylindrical part housing the chuck jaws and provided with at least one radial hole for the reception of a pin projecting from the end of a chuck key and a relatively rotatable sleeve having bevel gear teeth for engagement with a bevel pinion on the shank of the key, comprising a cylindrical shank having a bevel gear and a projecting pin at one end thereof, a tubular part slidable axially on said shank, a trough-like extension from one end of said tubular part, said trough-like extension being of greater diameter than said tubular part to accommodate the bevel pinion on the shank, and a circular enlargement at the end of the said trough-like extension, the said circular enlargement having its axis at right angles to the axis of the said tubular part and having semi-cylindrical walls to embrace the projecting part of a chuck, and having a central opening to accommodate the ends of the chuck jaws.

4. A chuck key and guide adapted for use with drill chucks of the type having a projecting cylindrical part housing the chuck jaws and provided with at least one radial hole for the reception of a pin projecting from the end of a chuck key and a relatively rotatable sleeve having bevel gear teeth for engagement with a bevel pinion on the shank of the key, comprising a cylindrical shank having a bevel gear and a projecting pin at one end thereof, a tubular part slidable axially on said shank, a trough-like extension from one end of said tubular part, said trough-like extension being of greater diameter than said tubular part to accommodate the bevel pinion on the shank, and a circular enlargement at the end of the said trough-like extension, said enlargement having a central hole, a slot extending from said hole to the outer end of the said enlargement, and semi-cylindrical walls for engaging the projecting part of a chuck.

5. A chuck key and guide adapted for use with drill chucks of the type having a projecting cylindrical part housing the chuck jaws and provided with at least one radial hole for the reception of a pin projecting from the end of a chuck key and a relatively rotatable sleeve having bevel gear teeth for engagement with a bevel pinion on the shank of the key, comprising a cylindrical shank having a bevel gear and a projecting pin at one end thereof, a tubular part slidable axially on said shank, a trough-like extension from one end thereof, said trough-like extension being of semi-circular cross-section and having a diameter greater than that of the said tubular part, and a cup-like part at the end of the trough-like extension, said cup-like part being arranged with its axis at right angles to the axis of the said tubular part and having a central hole and semi-cylindrical wall parts connected to the walls of the said trough-like extension.

6. A chuck key and guide adapted for use with drill chucks of the type having a projecting cylindrical part housing the chuck jaws and provided with at least one radial hole for the reception of a pin projecting from the end of a chuck key and a relatively rotatable sleeve having bevel gear teeth for engagement with a bevel pinion on the shank of the key, comprising a cylindrical shank having a bevel gear and a projecting pin at one end thereof, a tubular part slidable axially on said shank, a trough-like extension from one end thereof, said trough-like extension being of semi-circular cross-section and having a diameter greater than that of the said tubular part, and a cup-like part at the end of the trough-like extension, said cup-like part being arranged with its axis at right angles to the axis of the said tubular part and having a central hole, and a slot extending from said hole to the periphery of the cup-like part and having oppositely disposed semi-cylindrical walls projecting for engagement with the projecting part of a chuck.

JAMES CRADDOCK HINTON.

REFERENCES CITED

The following references are of record in the file of this patent:

UNITED STATES PATENTS

| Number | Name | Date |
| --- | --- | --- |
| 1,489,976 | Brown | Apr. 8, 1924 |
| 1,563,883 | Waters | Dec. 1, 1925 |
| 2,215,621 | Slavik | Sept. 24, 1940 |
| 2,386,011 | Stanley | Oct. 2, 1945 |
| 2,387,981 | Davis | Oct. 30, 1945 |
| 2,388,414 | Jernigan | Nov. 6, 1945 |